US 7,917,383 B2

(12) United States Patent
Maga et al.

(10) Patent No.: US 7,917,383 B2
(45) Date of Patent: Mar. 29, 2011

(54) METHOD AND SYSTEM FOR BOOSTING THE AVERAGE REVENUE PER USER OF PRODUCTS OR SERVICES

(75) Inventors: Matteo Maga, Milan (IT); Paolo Canale, Rome (IT); Astrid Bohe, Kronberg (DE)

(73) Assignee: Accenture Global Services Limited, Dublin (IE)

( * ) Notice: Subject to any disclaimer, the term of this patent is extended or adjusted under 35 U.S.C. 154(b) by 1333 days.

(21) Appl. No.: 11/291,439

(22) Filed: Dec. 1, 2005

(65) Prior Publication Data

US 2007/0112615 A1    May 17, 2007

(30) Foreign Application Priority Data

Nov. 11, 2005  (EP) ..................... 05425796
Nov. 11, 2005  (IT) ............... BS2005A0136

(51) Int. Cl.
*G06F 17/60* (2006.01)
*G07G 1/00* (2006.01)
(52) U.S. Cl. .............................. 705/10; 705/1
(58) Field of Classification Search ...... 705/10
See application file for complete search history.

(56) References Cited

U.S. PATENT DOCUMENTS

| | | | |
|---|---|---|---|
| 5,930,764 A * | 7/1999 | Melchione et al. ............ | 705/10 |
| 6,167,396 A | 12/2000 | Lokken | |
| 6,240,411 B1 | 5/2001 | Thearling | |
| 6,925,441 B1 | 8/2005 | Jones, III et al. | |
| 6,968,316 B1 | 11/2005 | Hamilton | |
| 7,120,629 B1 * | 10/2006 | Seibel et al. ........................ | 1/1 |
| 7,200,607 B2 * | 4/2007 | Downs ................................. | 1/1 |
| 7,376,603 B1 | 5/2008 | Mayr et al. | |
| 2003/0018503 A1 | 1/2003 | Shulman | |
| 2004/0039593 A1 * | 2/2004 | Eskandari ........................ | 705/1 |
| 2004/0103051 A1 | 5/2004 | Reed et al. | |

(Continued)

FOREIGN PATENT DOCUMENTS

WO    WO 00/34910    *  6/2000

(Continued)

OTHER PUBLICATIONS

Kleissner, Ph.D., *Data Mining for the Enterprise*, Ariba Technologies, IEEE, pp. 295-304, 1998.

(Continued)

*Primary Examiner* — Kambiz Abdi
*Assistant Examiner* — Sarah M Monfeldt
(74) *Attorney, Agent, or Firm* — Brinks Hofer Gilson & Lione

(57) ABSTRACT

An enhanced business reporting methodology and system architecture provide a way to receive, store, and manipulate customer and revenue data to increase average revenue per user for a business. The system and method analyze a business's current revenue streams and historical revenue trends to identify those revenue streams that may benefit from stimulation, assess the effectiveness of past marketing campaigns, select a revenue stream and strategy to increase the revenue for the selected revenue stream, select a previously successful marketing campaign consistent with the selected strategy. The system and method analyze the customer base to identify characteristics of customers who have responded positively to previous marketing campaigns and whose revenue has increased as a result, in order to create statistical models to identify customers with similar traits, and apply the statistical models to score and select customers to contact during future campaigns.

27 Claims, 8 Drawing Sheets

U.S. PATENT DOCUMENTS

| | | | |
|---|---|---|---|
| 2004/0186762 A1 | 9/2004 | Beaven et al. | |
| 2004/0186765 A1 | 9/2004 | Kataoka | |
| 2004/0215656 A1* | 10/2004 | Dill et al. | 707/103 R |
| 2004/0236649 A1* | 11/2004 | Yip et al. | 705/30 |
| 2005/0021433 A1 | 1/2005 | Hyler | |
| 2005/0091071 A1 | 4/2005 | Lee | |
| 2005/0177598 A1 | 8/2005 | Hao et al. | |
| 2005/0203768 A1 | 9/2005 | Florance et al. | |
| 2006/0129447 A1 | 6/2006 | Dockery et al. | |
| 2006/0259364 A1 | 11/2006 | Strock et al. | |
| 2006/0282432 A1 | 12/2006 | Cassidy et al. | |
| 2007/0033127 A1 | 2/2007 | Masuyama et al. | |
| 2007/0112614 A1* | 5/2007 | Maga et al. | 705/10 |
| 2007/0118419 A1* | 5/2007 | Maga et al. | 705/10 |
| 2007/0118444 A1* | 5/2007 | Maga et al. | 705/30 |
| 2007/0156673 A1* | 7/2007 | Maga et al. | 707/5 |
| 2007/0185867 A1* | 8/2007 | Maga et al. | 707/6 |
| 2007/0260498 A1 | 11/2007 | Yokota et al. | |

FOREIGN PATENT DOCUMENTS

| | | | |
|---|---|---|---|
| WO | WO 00/34910 A2 | | 6/2000 |
| WO | WO 01/29692 A2 | | 4/2001 |
| WO | WO 01/93158 | * | 12/2001 |
| WO | WO 01/93158 A1 | | 12/2001 |

OTHER PUBLICATIONS

Nadinic et al., *New Possibilities for Knowledge Discovery in Telecommunication Companies*, 8th International Conference on Telecommunications—ConTEL 2005, ISBN, Zagreb, Croatia, pp. 259-263, Jun. 15-17, 2005.

Roiger et al, *A Majority Rules Approach to Data Mining*, Mankato State University, Mankato MN, IEEE, pp. 100-107, 1997.

European Search Report dated Feb. 14, 2006.

Opinion for Application No. 05 425 796.9.

Kleissner, Charly, "Data Mining for the Enterprise," IEEE Proceedings 31st Annual Hawaii International Conference on System Sciences, Copyright 1998, pp. 295-304.

Mitchell, Tom M., "Machine Learning and Data Mining", Communications of the Association for Computing Machinery (ACM), Nov. 1999/ vol. 42 No. 11, Copyright 1999, pp. 30-36.

Nadinic, Berislav, "New Possibilities for Knowledge Discovery in Telecommunication Companies," 8th International Conference on Telecommunications—ConTel 2005, Jun. 15-17, 2005, Zagreb, Croatia, pp. 259-263.

Pedro R. Falcone Sampaio et al.: "Business Process Design and Implementation for Customer Segmentation e-Services" Proceedings of the 2005 IEEE International Conference on E-Technology, E-Commerce and E-Service, EEE-05, Hong Kong, China, Mar. 29-Apr. 1, 2005, Copyright 2005, pp. 228-234, including Table of Contents pp. v-xiv.

Richard J. Roiger et al., "A Majority Rules Approach To Data Mining," Proceedings of International Conference on Intelligent and Cooperative Information Systems, Copyright 1997, pp. 100-107.

United States Patent and Trademark Office Action dated Jul. 23, 2009 for co-pending U.S. Appl. No. 11/291,438.

United States Patent and Trademark Office Action dated Oct. 28, 2009 for co-pending U.S. Appl. No. 11/293,025.

United States Patent and Trademark Office Action dated Nov. 24, 2009 for co-pending U.S. Appl. No. 11/292,843.

United States Patent and Trademark Office Action dated Jul. 23, 2009 for co-pending U.S. Appl. No. 11/291,438.

United States Patent and Trademark Office Action dated Jan. 21, 2010 for co-pending U.S. Appl. No. 11/291,438.

United States Patent and Trademark Office Action datd Apr. 28, 2010 for co-pending U.S. Appl. No. 11/293,025.

Raaij et al., "The Implementation of Customer Profitability Analysis: A Case Study," Industrial Marketing Management, 2003, pp. 573-583 [available online at www.sciencedirect.com].

Office Action dated Apr. 2, 2010 for Italian Patent Application No. BS2005A000136.

Office Action dated Apr. 2, 2010 for Italian Patent Application No. BS2005A000144.

United States Patent and Trademark Office Action dated May 26, 2010 for co-pending U.S. Appl. No. 11/292,843.

Terplan, Kornel, "OSS Essentials: Support System Solutions for Service Providers," 7601010 Advanced Course in Network Based Automation, Dec. 1, 2003 http://www.ac.tut.fi/aci/courses/7601010/2003/_esitykset/7.4%20-%207.5.pdf.

Teegerstrom, Trent and Tronstad, Russel, "Overview of Ranch Financial Analysis Spreadsheet," Ranch Business Management, 2001 http://ag.arizona.edu/AREC/pubs/rmg/6%20ranchbusinessmanagement/56%20ranchfinancialspreadsheet01.pdf.

\* cited by examiner

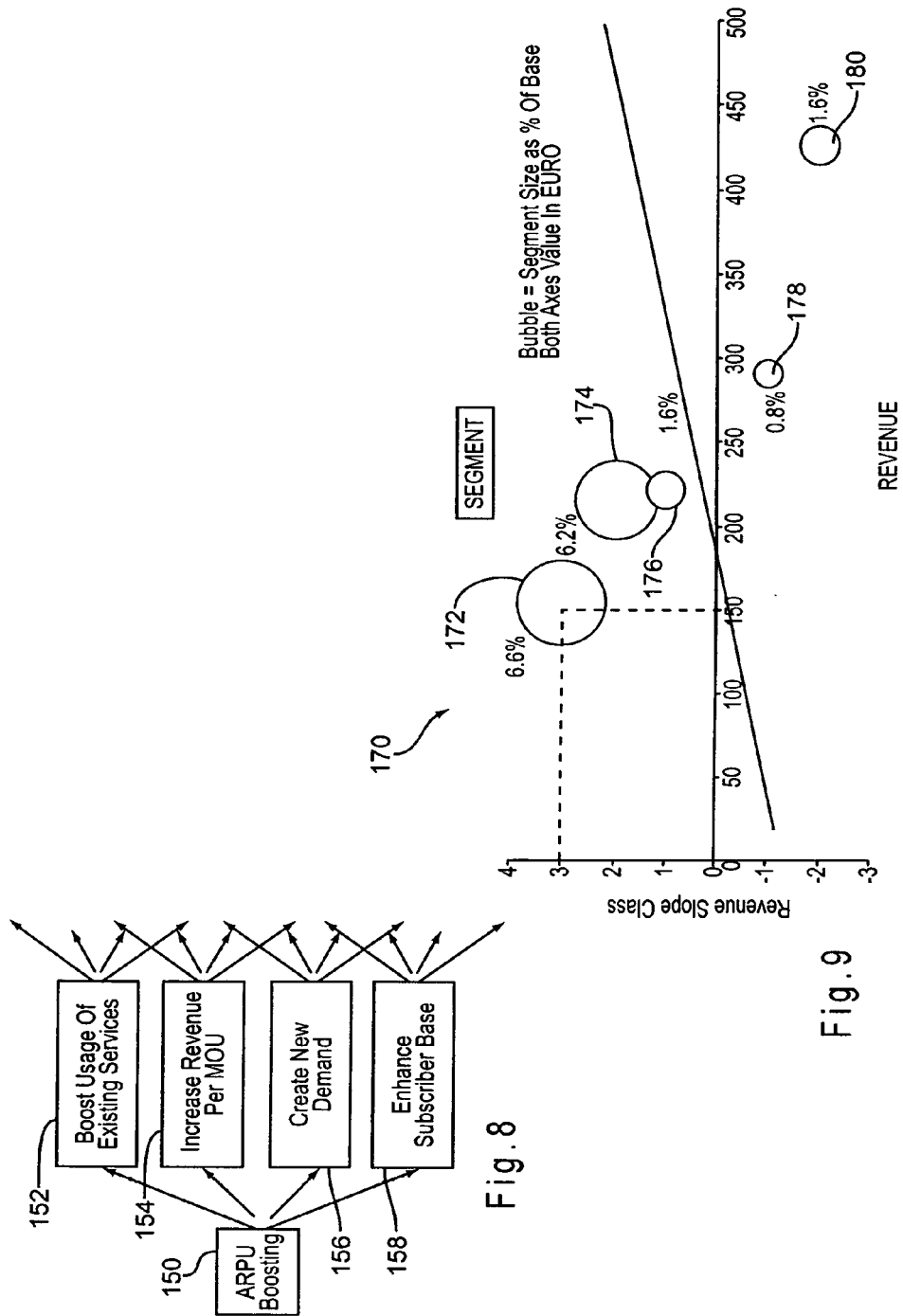

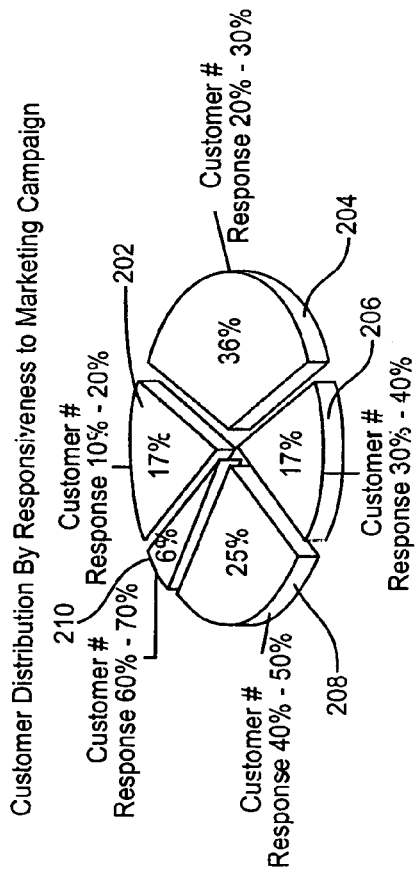
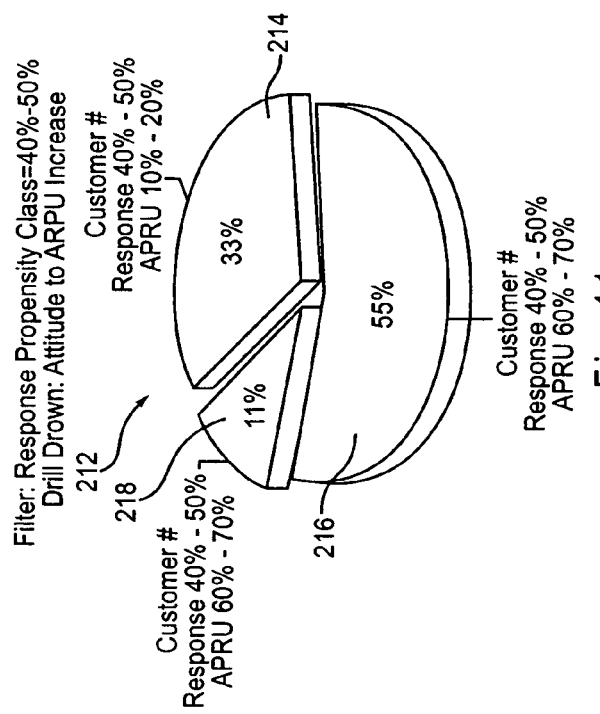

METHOD AND SYSTEM FOR BOOSTING THE AVERAGE REVENUE PER USER OF PRODUCTS OR SERVICES

PRIORITY CLAIM

This application claims the priority benefit of EPO Application No. 05425796.9, filed Nov. 11, 2005 and Italian Application No. BS2005A000136, filed Nov. 11, 2005, both of which are incorporated herein by reference in their entirety.

BACKGROUND

The present invention relates to a method for designing and executing marketing campaigns for increasing the revenue received from a business's existing customer base. The invention also provides a system for supplying analytical tools necessary to implement the revenue boosting method.

Revenue is a key component of profit. In order to increase profit a business has two fundamental options: increase revenue and/or decrease costs. The focus of the present disclosure is increasing revenue. There are a number of ways a business may increase revenue. A business may add new products or services to its existing line of products and services in hopes of increasing its overall sales. A business may attempt to attract new customers for its existing products or services. Or, a business may attempt to increase the revenue it receives from the sale of its existing products and services to its existing customer base. This last approach is especially well suited to businesses that provide services to customers on an ongoing basis. Such businesses, for example telecommunications companies, have ongoing relationships with their customers and are well positioned to take steps to stimulate revenue growth among their existing customer base. For example, such companies may take steps to increase customer use of services to which customers already subscribe. Alternatively, the business may increase the rates it charges for particular services. This can be a somewhat riskier proposition, however, in that if rates are raised too high customers may choose to drop the service rather than pay the higher rates, resulting in a net loss in revenue. Finally, the business may attempt to increase revenue by selling additional services to existing customers.

In the unending quest for higher profits, businesses will often go to great lengths to increase revenue. Businesses often mount elaborate (and expensive) marketing campaigns designed to influence consumer behavior in a way that will lead to increased revenue. Often such campaigns are directed toward existing customers. Typically such campaigns will offer some incentive to influence the customer's behavior. For example a business may offer reduced rates to a customer for a period of time for signing up for a new service, or a business may offer rewards to customers whose use of a service surpasses a certain threshold. The types and variety of such campaigns are limited only by the creativity of the enterprise's marketing team.

The most effective campaigns are those in which customers are contacted directly. In such campaigns offers may be communicated to customers over many different channels. For example campaign offers may be included in billing statements sent to customers each month. Telemarketing campaigns may be instituted to contact customers by phone. Wireless telephone customers may be reached via text messages sent to their mobile phones. Email messages may be the best channel to reach other groups of customers. Faxes and direct mailings are still other channels by which a business may reach its customers to communicate special offers designed to stimulate revenue growth.

Direct marketing campaigns can be expensive. Because the cost of individually contacting large numbers of customers is high, marketing campaigns are often limited to smaller select segments of the customer population. Ideally each campaign will be directed toward customers who will most likely respond positively to the campaign, and whose positive response will lead to the greatest increase in revenue. For example, when designing marketing campaigns for telecommunications service providers, the incentive offered in a first campaign may be much more attractive to young prepaid mobile phone customers, and the incentive offered in a second campaign may be more attractive to older fixed-line customers. Obviously, offering the first incentive to fixed-line customers above the age of 60 will not likely increase the average revenue per user (ARPU) as much as making the offer to pre-paid mobile customers between the ages of 20-25. Conversely, offering the second incentive to younger pre-paid customers would seem a similar folly.

A number of factors contribute to the success of direct marketing campaigns. The first is that the campaign itself must be tailored to marketing goals. In other words, a marketing campaign intended to increase revenue from a specific service should have the effect of actually raising the revenue received from that service. Secondly, the campaign must be directed toward the appropriate customers. Ideally, every customer contacted during a campaign would accept the offer and the revenue generated from each customer would be increased. This of course is not likely to happen. However, if a marketing campaign is directed toward customers who are most likely to accept the offer, and who are likely to exhibit the greatest increase in revenue when they accept the offer, the odds of success are significantly enhanced.

BRIEF SUMMARY

The present invention relates to a method for increasing the average revenue per user (ARPU) of a business's products or services, as well as a system for providing data analysis tools for implementing the ARPU boosting method. The invention allows marketers to identify products, services, or lines of business in which revenues are lagging, and helps marketers or other business users design and execute marketing campaigns directed toward the business's customer base which are focused on increasing the revenue from targeted products, services or lines or business. Employing the method and system of the present invention, marketers can be assured that the marketing campaigns that they create are targeted to the customers who will most likely respond favorably to the campaign, and whose revenue will likely show the greatest increase when they accept the campaign offer.

The method of the present invention defines the activities that must be performed to identify opportunities for increasing revenue, selecting an appropriate campaign for addressing an identified opportunity, and identifying the most appropriate customers or users to contact in order to maximize the effectiveness of the campaign. The system generates a plurality of analysis tools which assist marketing personnel throughout the process of developing new campaigns.

According to an embodiment of the invention a method for increasing an enterprise's revenue is provided. Preferably the method is performed in conjunction with a system that includes an optimized data mart, a data mining tool and a user access module that includes a user interface. The method begins by receiving revenue and customer data from an enterprise's external operating systems. Preferably the data are received on a regular basis over time in synchronization with the enterprise's billing cycle. The received data are loaded into the data mart. Data stored in the data mart can be accessed to build an interactive diagnostic tree that may be viewed and manipulated by a business user via the user access module. The diagnostic tree provides an analysis of the enterprise's revenue based on individual revenue streams. Each revenue stream corresponds to the sale or use of various products or services offered by the enterprise. The interactive diagnostic tree displays, among other things, the average revenue per user (ARPU) of the products or services corresponding to each revenue stream. The customer and revenue data are next used for generating interactive reports illustrating ARPU trends for analyzing ARPU changes over time. The diagnostic tree analysis and the ARPU trend analysis assist the business user in selecting a revenue stream in need of ARPU boosting and assessing the effectiveness of past marketing campaigns based on past ARPU trends accompanying such campaigns. The next action that must be taken is to identify an appropriate ARPU increase lever that may be exploited to increase ARPU in the targeted revenue stream. Revenue and customer data stored in the data mart are mined to identify characteristics of customers relevant to increasing ARPU. The identified characteristics are used to create an ARPU increase model for predicting a customer's propensity to generate increased revenue and a positive response model for determining a customer's propensity to respond positively to a marketing campaign. Once models have been built, individual customers are scored according to their propensity to generate increased revenue and their propensity to respond favorably to a marketing campaign. The results of the scoring can be used for filtering the customer base. The scoring and filtering of the customer base leads to the compilation of a customer list representing the optimal mix of customers likely to respond favorably to a campaign and who will most likely generate additional revenue. Once the optimal customer list is compiled the campaign may be executed.

According to another aspect of the invention, a system architecture for facilitating the design and implementation of direct marketing campaigns is provided. At the core of the system architecture is a relational database that includes a data model that is optimized for fast retrieval and analytical reporting. At least one data source is provided for supplying customer and revenue data to the database. A population architecture associated with the database is provided for extracting data from the at least one data source, transforming the extracted data, and loading the transformed data into the database in accordance with the optimized data model. The data stored in the data base are used for analyzing an enterprise's revenue streams and customer base to identify opportunities for boosting the average revenue per user of the enterprise's products and services, to identify characteristics of customers that indicate a propensity to generate increased revenue and to respond favorably to marketing campaigns, and to identify customers sharing those characteristics. To this end, a data manipulation module is provided for pulling data from the database and preparing the data for data mining. A data mining module is provided for analyzing the customer and revenue data prepared by the data manipulation module to identify characteristics of customers leading to a propensity to accept a marketing campaign offer, and a propensity to generate increased revenue. The data mining module creates statistical models for predicting a customer's propensity to generate increased revenue, and propensity to accept marketing campaign offers. The statistical models are used to score individual customers according to their individual propensities. The results of the scoring are stored in the database.

Finally, a user access module having access to the data stored in the database is provided. The user access module includes an interface for displaying data for a user and receiving commands from the user. The user access module includes a plurality of pre-configured reports for presenting data to the user, including reports illustrating the distribution of customers based on their propensity to accept a marketing campaign offer and their propensity to generate increased revenue scores to the user.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 8 is a block diagram of ARPU increase value levers;

FIG. 9 is a chart showing customer revenue trend line slope v. revenue by customer segment;

FIG. 10 is a chart showing customer distribution by propensity to accept a marketing campaign offer;

FIG. 11 is a chart showing the distribution of customers from a class of customers having similar propensities to accept a campaign offer filtered by their propensity to generate additional revenue;

DETAILED DESCRIPTION OF THE DRAWINGS AND THE PRESENTLY PREFERRED EMBODIMENTS

An embodiment of the invention has been specially adapted for boosting the average revenue per user (ARPU) of a telecommunications service provider's (Telecom's) services. The invention as applied to boosting a Telecom's ARPU permeates the present disclosure. However, those of ordinary skill in the art will understand that the methods and tools described herein as adapted to the specific requirements of services offered by a Telecom are readily adaptable to the requirements of and the services and products offered by businesses in other industries as well.

Figure 1:
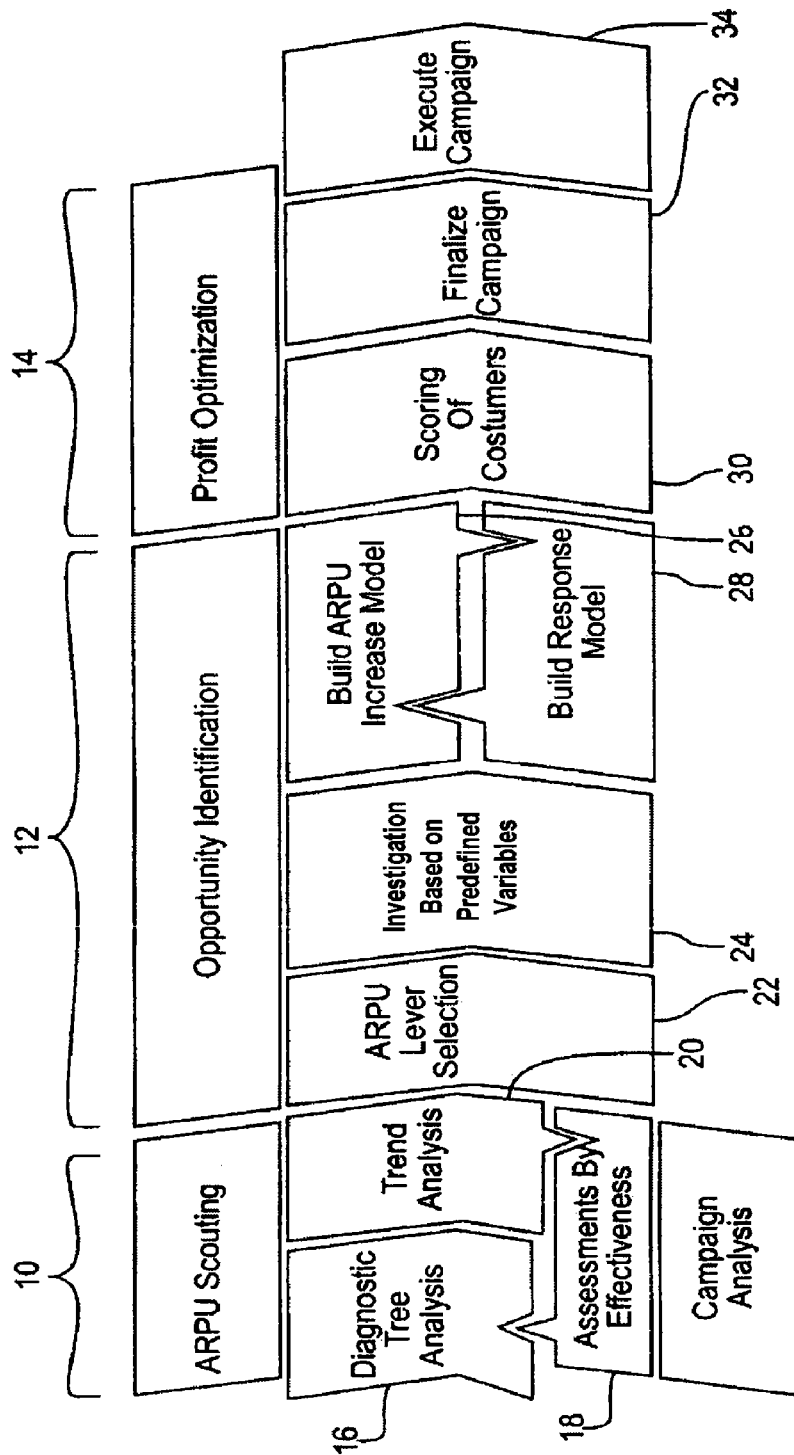
FIG. 1 is a flow chart showing a method for increasing average revenue per user according to an embodiment of the invention.

A flowchart depicting the method for boosting ARPU according to the invention is shown in FIG. 1. The method can be divided into three distinct phases: ARPU scouting/campaign analysis 10; opportunity identification 12; and profit optimization 14. The ARPU scouting campaign analysis phase 10 relates to identifying opportunities for increasing revenue within an enterprise's existing revenue streams. For example, if ARPU is below forecast for a particular product, service or other revenue source, that product, service or revenue source may present a promising opportunity for boosting revenue. The ARPU scouting/campaign analysis phase also considers trends over time to determine whether current measures of ARPU represent an accurate picture of where ARPU has been and where it is heading. Finally, the ARPU scouting/campaign analysis phase 10 includes an assessment of past marketing campaigns. This can provide valuable insight into what types of campaigns are most effective in boosting ARPU for specific revenue sources.

Upon completion of the ARPU scouting/campaign analysis phase 10, a marketer or other business user will have determined whether the enterprise's ARPU is a problem and identified the various revenue streams in need of ARPU stimulation. The ARPU scouting/campaign analysis phase 10 also helps identify which business areas and customer segments would benefit from ARPU boosting, and what steps can be taken to improve total revenue, or mitigate or reverse declining revenue. Finally, the ARPU scouting/campaign analysis phase 10 provides insight into the campaigns that have been most successful in the past, and the areas of the business and customer segments for which the various types of campaigns have been most effective.

Armed with the information developed in the ARPU scouting/campaign analysis phase 10, the marketer or business user moves into the opportunity identification phase 12. From the ARPU scouting/campaign analysis phase 10, the user has already identified a product, service, or line of business to be targeted for ARPU boosting. In the opportunity identification phase 12 the user determines the best strategies for boosting ARPU for the identified product, service, or line of business. The user determines what are the most significant variables for increasing ARPU, and models the characteristics of the best customers to contact in a campaign to increase ARPU for the identified product, service, or line of business. These characteristics include the customers most likely to respond positively to ARPU boosting stimulation, and those who will likely generate the greatest ARPU increase.

The profit optimization phase 14 may be thought of as an implementation phase. First, the customers are scored 30 to determine their expected revenue increase and propensity to respond favorably to ARPU boosting stimulation. The customers to be contacted during a marketing campaign are selected based on the customer scoring and the campaign is finalized 32. Finally, the campaign is executed 34.

All of the activities leading to the execution of a campaign are geared toward finding the areas of an enterprise's business that could most benefit from ARPU boosting, identifying the most effective campaigns for boosting ARPU in the identified business areas, and determining the customers who will most likely respond favorably to ARPU boosting efforts and add additional revenue, and the best ways to contact them. All of these factors lead to more effective campaigns.

We now turn to the constituent elements of the three phases of the ARPU boosting method. The ARPU scouting/campaign analysis phase 10 includes three components, a diagnostic tree analysis 16, trend analysis 20, and assessment by campaign effectiveness 18.

The diagnostic tree analysis is an analytic tool that has been developed to provide insight into a business's revenue sources and for evaluating whether revenue performance, specifically ARPU, from various products, services, lines of business or other revenue streams, is satisfactory. The diagnostic tree analytic tool is the subject of a co-pending patent publication No. 2007/0118444, filed Dec. 1, 2005. The entire teaching of which is incorporated herein by reference.

Figure 2:
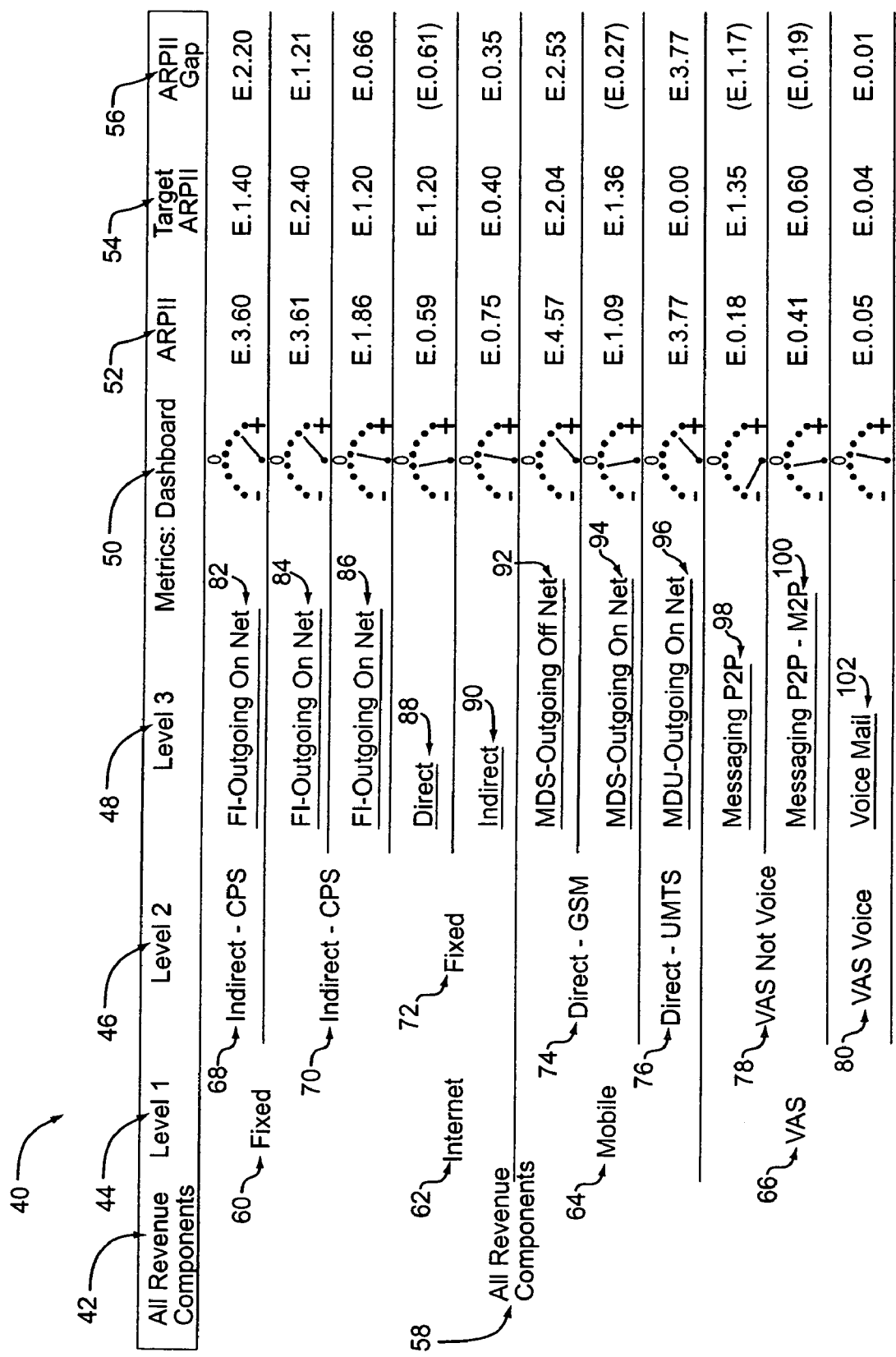
FIG. 2 is a diagnostic tree for analyzing the average revenue per user among a plurality of revenue streams.

An example of a diagnostic tree 40 is shown in FIG. 2. The diagnostic tree breaks down an enterprise's revenue stream along product or service lines into narrower and narrower tributaries as one moves up the tree. The diagnostic tree 40 shown in FIG. 2 has been generated to illustrate the revenue stream of a telecommunications service provider. The diagnostic tree 40 shows the Telecom's revenue stream broken down to three levels of detail. A first column 42 includes all revenue components. A second column 44 shows Level 1 revenue components. These include revenue from: fixed (land-line) phone services 60; Internet services 62; mobile telephone services 64; and value added services (VAS) 66. A third column 46 shows Level 2 revenue components. In Level 2 revenue from fixed services has been broken out into: Indirect-CPS (Carrier Pre Selection) 68, and indirect CS (Carrier Selection) 70. Internet revenue 62 has only one level 2 component, namely Fixed Revenue 72. Mobile services revenue 64 is broken out into direct GSM 74 and direct UMTS in Level 2. VAS 66 is broken out into VAS Not-Voice 78, and VAS Voice 80. A fourth column 48 shows Level 3 revenue components. In Level 3 the Fixed 60, Indirect-CPS 68 revenue corresponds to a single source, FI-Outgoing On Net 82. Fixed 60, Indirect CS 70 revenue is broken out into FIC Outgoing Off Net 84, and FIC Outgoing On Net 86. Revenue from Internet 62, Fixed 72 service is broken out into Direct 88 and Indirect 90. Mobile 64, Direct GSM 74 revenue is broken out into MDS-Outgoing Off Net 92 and MDS-Outgoing On Net 94, and Mobile 64, Direct UMTS 76 revenue has a single level 3 component MDU-Outgoing on net 96. Value Added Services 66, Not Voice 78 include level 3 revenue from Messaging P2P 98 and Messaging P2P-M2P 100. Value added services 66 voice 80 includes the sole level 3 revenue component Voice Mail 102.

The diagnostic tree 40 displays the calculated average revenue per user (ARPU) for each revenue component displayed in Level 3 in the sixth column 52. The diagnostic tree also displays a target ARPU for each revenue component displayed in level 3 in the seventh column 54. The next column 56 displays the ARPU gap between the actual ARPU and the target ARPU for each revenue component displayed in level 3. Finally, a "Dashboard" icon is displayed in column 50 for each revenue component displayed in level 3. The "DASHBOARD" icon provides a quick visual indication of the size of the ARPU gap (column 56) for each data stream and whether it is positive or negative.

The system supporting the method presently being described calculates the ARPU values displayed in column 52 directly from customer invoice data each month. The target ARPU values in column 54 may be based on market forecasts, performance goals, or industry benchmarks. According to an embodiment, the diagnostic tree 40 is a dynamic, interactive tool. A user may select the level for which ARPU data are to be displayed, or the user may choose to view ARPU data for only a certain segment of the customer population. For example, a user may choose to view level two ARPU data for all male customers age 25-34. In this case, column 58 displaying level 3 information would not be present and column 52 would display ARPU data for all of the level 2 revenue components. Further, the ARPU data in column 52 would be calculated only from male customers aged 25-34.

The diagnostic tree provides marketers and business users a quick visual indication of which components of the revenue stream are performing well and which are in need of an ARPU boost. Those revenue components for which the ARPU gap is positive are performing better than forecast, or better than the industry trend, and those for which the ARPU gap is negative are performing worse. The revenue components having a negative ARPU gap are obvious targets for ARPU boosting.

Returning to the flow chart in FIG. 1, trend analysis 20 is another component of the ARPU scouting/campaign analysis phase 10. Trend analysis essentially stretches the diagnostic tree into the past. Whereas the diagnostic tree provides a single month snapshot of ARPU based on the most recent month's available revenue data, the trend analysis looks at how the ARPU data have changed over time. These data can highlight areas of concern or positive developments that may not be apparent from a single month snapshot of the ARPU data from a single billing cycle. For example, the diagnostic tree analysis of a particular month may show that the ARPU of a highly profitable revenue stream is safely above the industry benchmark level. No cause for concern. However checking the trend over the past six months may indicate that the ARPU for this revenue stream has declined steadily in each of the last six months. Accordingly ARPU boosting initiatives may be appropriate to shore up this profitability source to prevent further erosion.

Trend analysis typically will have a granularity of one month increments since the revenue data on which the trend analysis relies corresponds to the enterprise's one month billing cycle. Of course if revenue data area available from other sources or on other time frames the granularity of the trend data may be based on some other time interval.

Figure 3:
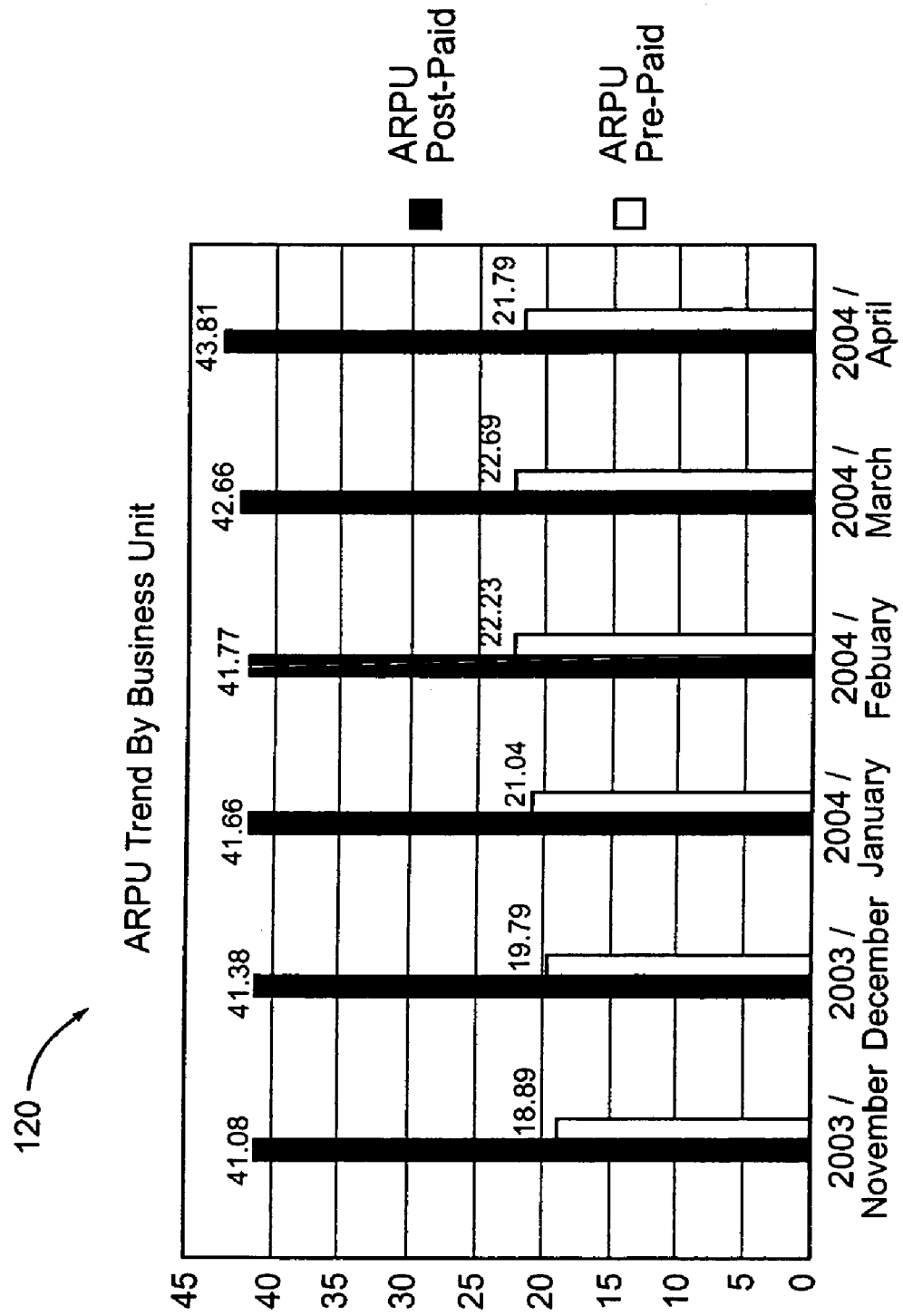
FIG. 3 is a chart showing ARPU trends among business units.
Figure 4:
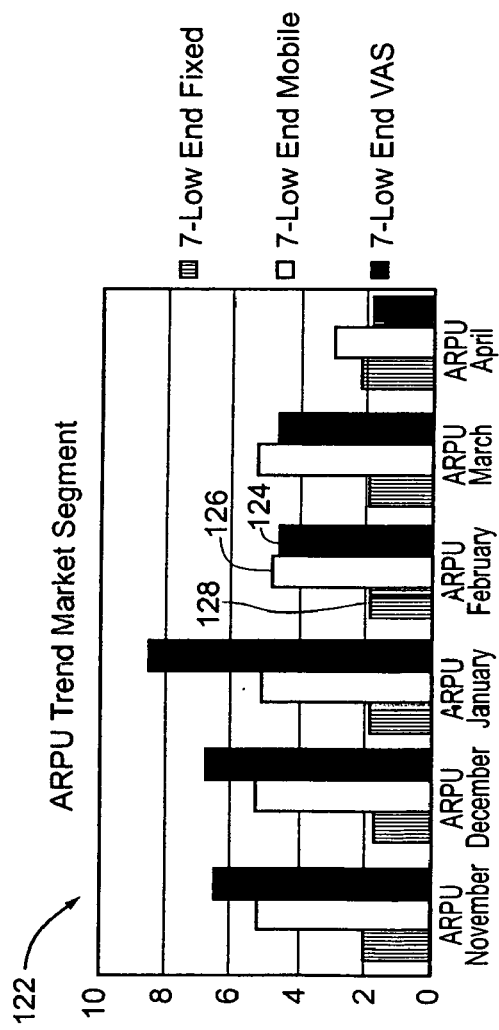
FIG. 4 is a chart showing ARPU trends by various market segments.

The trend analysis data may be segmented, grouped, manipulated, organized and presented any number of ways to provide multiple views of ARPU trends over time. The system supporting the present method includes configurable reporting tools for representing ARPU trends in convenient graphical form. For example, FIG. 3 is a graph 120 showing the ARPU trend of pre-paid and post-paid business units over a six month period. FIG. 4 shows a similar six month trend analysis 122 of ARPU by market segment. The graph 122 shows ARPU values for low-end fixed customers 124, low end mobile customers 126, and low end VAS customers 128 for each of the six months. These are but two of the essentially limitless ways in which the ARPU trend data may be segmented and displayed. A thorough analysis of ARPU trends allows a business user to evaluate how ARPU, revenue in general, the customer base, and other key performance indicators, change offer time. This allows the user to spot and anticipate seasonal effects and changing market conditions, and assess the effectiveness of previous marketing strategies.

Figure 6:
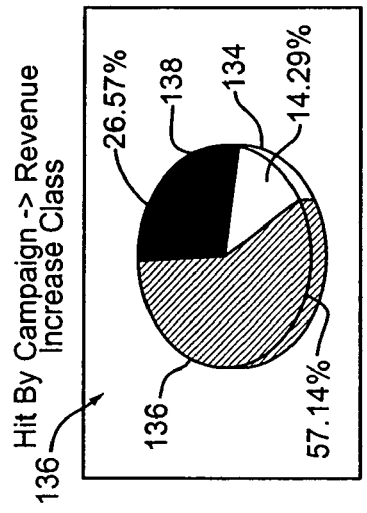
FIG. 6 is a chart showing the customer distribution of customers contacted by a marketing campaign by revenue class.
Figure 5:
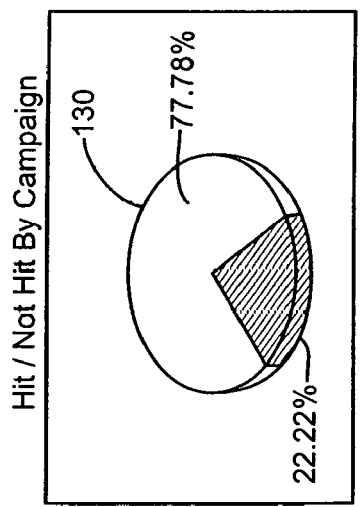
FIG. 5 is a chart showing the distribution of customers contacted during a marketing campaign in relation to those not contacted during the campaign.
Figure 7:
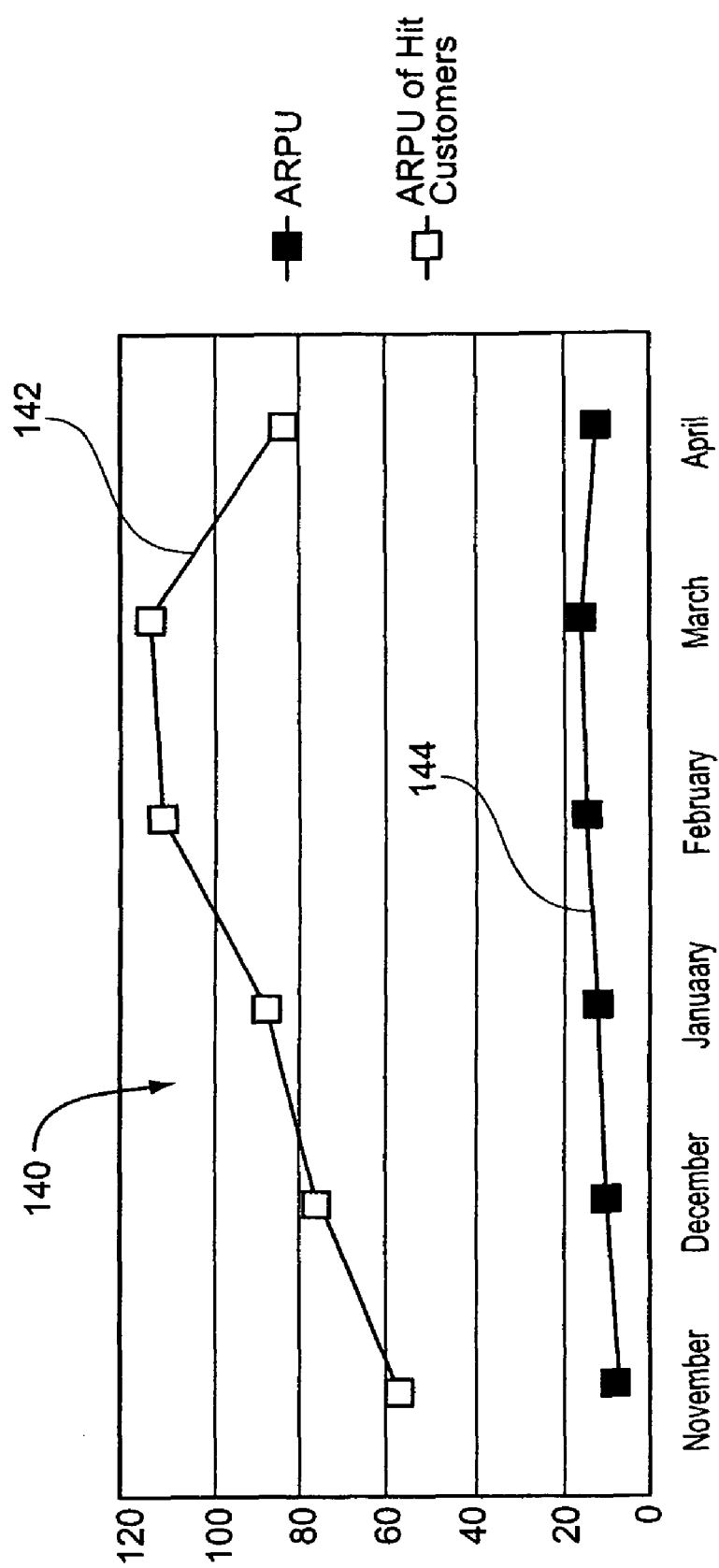
FIG. 7 is a chart showing ARPU trends of customers contacted during a marketing campaign and customers not contacted during the campaign.

The final component of the ARPU Scouting/Campaign Analysis phase 10 is assessing the effectiveness of previous campaigns 18. The only meaningful measure of any program to boost revenue is whether, as a result of the program, revenue has indeed increased. In the case of direct marketing campaigns it is instructive to compare the revenue of customers who were contacted or "hit" during the campaign to those who were not revenue figures for time periods both before and after the campaign should be consulted. Customers not hit during the campaign may act as a control group isolating the effects of the campaign to ensure that any increase (or decrease) in revenue or ARPU, is the result of the campaign and not some other external factor or factors. The system supporting the present method includes reporting tools for assessing the effectiveness of campaigns. For example, FIG. 5 shows a circle chart 130 illustrating the percentage of the total customer population hit by a direct marketing campaign. In this case, 22.22% of all of the enterprise's customers were contacted. 77.78% were not. FIG. 6 is another circle chart 132 this one showing the population of hit customers segmented by revenue increase classes. In this example there are three defined classes; customers whose revenue decreased from 0% to −1% 134, customers whose revenue increased from 0% to 1% 136, and customers whose revenue increased from 1% to 2% 138. This chart shows that more than 80% of hit customers saw an increase in revenue. Furthermore, over one quarter of hit customers saw a fairly significant 1% to 2% increase in revenue. This chart does not show, however, how the revenue increases of hit customers compare to those of non-hit customers. FIG. 7 shows this analysis.

FIG. 7 is a chart 140 showing the ARPU trend over a six month period. The upper curve 142 represents the ARPU trend of customers hit by a direct marketing campaign. The lower curve 144 represents the ARPU of customers not hit by the campaign. The customers hit by the campaign show a substantial increase in ARPU over the six month period, whereas the ARPU of customers not hit by the campaign remained substantially flat. Clearly the direct marketing campaign had a positive effect on the revenue from customers hit by the campaign and could be classified a success. Such analysis may be performed on all campaigns in order to learn which campaigns are successful and which are not. Furthermore some campaigns may be effective for boosting revenue among certain segments of the customer base and not in others, and some campaigns may be successful for boosting revenue for certain business units and revenue streams and not for others. The assessment by effectiveness process 18 leads to a better understanding of which campaigns or types of campaigns should be employed to reach specific revenue goals.

Armed with the data and insights developed in the ARPU Scouting/Campaign Analysis phase 10, the marketer or business user proceeds to the Opportunity Identification stage 12. At this point the user has determined which revenue stream will be targeted for ARPU boosting based on the diagnostic tree analysis 16 and trend analysis 20, and will have knowledge of which campaigns have been effective for raising ARPU for this revenue stream in the past from the assessment by effectiveness 18. The Opportunity Identification phase 12 includes ARPU lever selection 22, investigation based on predefined variables 24, building an ARPU increase module 26, and building a customer response model 28.

ARPU lever selection is the process by which the enterprise determines which value lever it will exploit in its effort to increase revenue. According to this aspect of the ARPU boosting process, ARPU boosting initiatives are classified by value levers. The value levers are a hierarchical classification scheme that organizes and defines various steps that can be taken by an enterprise to increase revenue. The classification structure may be based on enterprise wide or industry wide experience, and may take into account elements of the enterprise's overall marketing strategy.

FIG. 8 shows ARPU boosting value levers that have been developed for telecommunications service providers. This classification structure is based on combined industry experience and has been adopted by many Telecoms world wide. The first level indicates the purpose of the set of value levers, namely ARPU boosting 150. The second level includes four levers that can be exploited to wring additional revenue from existing revenue streams. These include boosting usage of existing services 152, increasing revenue per minute of use (MOU) 154, creating new demand 156, and enhancing the subscriber base 158. Additional levers are defined for implementing these primary levers.

Selection of the ARPU lever defines the strategy for increasing revenue from the selected revenue stream. Over time, the enterprise may compile a comprehensive catalog of campaigns available for increasing ARPU along each value lever. The most successful campaigns may be classified under the appropriate lever. Furthermore, marketing personnel may expand and improve the catalog as new campaigns are employed and the results analyzed. By selecting the desired ARPU lever the user effectively determines the best campaigns to choose from when initiating a new campaign to increase revenue from the identified revenue stream along the selected value lever.

By this point in the process a user has identified the revenue stream targeted for ARPU boosting, identified the strategy for boosting ARPU in the targeted revenue stream and selected an appropriate campaign for achieving the enterprise's revenue goals. It remains to determine the best customers to contact during the campaign. This process begins with the investigation based on predefined variables 24. The goal of this investigation is to identify characteristics of customers who have already responded positively to ARPU boosting efforts along the selected value lever in hopes of identifying additional customers having similar characteristics who would be appropriate targets for a marketing campaign directed toward increasing ARPU along the same value lever.

The investigation based on predefined variables begins with an analysis of each customer's revenue trend over a specified period. The period of analysis may extend from one month to several years. The only requirement is that there be at least two data points so that a trend line may be calculated to model the behavior of customer's revenue over the given period. If multiple data points are available, the trend line that best fits the data may be calculated via a least squares regression line or some other statistical method. The customer ARPU trend line calculated in this manner provides a rough estimate of how the revenue from the customer has changed during the period under investigation. The most relevant feature of the customer trend line is its slope. The slope of the trend line represents the average rate at which the customer's revenue has changed over time and likely will continue to change, at least in the short run. This ARPU trend line analysis is performed for each customer in the customer base. Customers may then be classified according to the slope of their trend line. For example revenue slope classes may be defined for customers having a positive revenue trend line slope of from 0° to 1°, 1° to 20° and greater than 20°, or negative trend line slopes of from 0° to −1°, −1° to −20°, and less than −20°. The various revenue classes may then be plotted against revenue, as shown in FIG. 9.

The graph 190 in FIG. 9 is a "bubble chart" that shows the distribution of customers in a particular customer segment distributed between the various revenue slope classes and their average revenue. The center of each "bubble" corresponds to the respective values along the X and Y axes of the plot. The size of the "bubble" corresponds to the size of the customer population within the particular class as a percentage of the overall customer population. Thus, the "bubble" 172 corresponds to customers in revenue slope class 3 (positive trend line slope >20°) and having an average revenue of $150. This class of customers represents 6.6% of the total customer population. Similarly, the bubble 174 represents customers in revenue slope class 2 (positive revenue line slope where 1.0°< revenue slope <20°). The ARPU for this group is approximately $210 and the group constitutes 6.2% of the customer population. Bubble 176 represents revenue class 1 (0° revenue slope <1°). The ARPU of this group of customers is approximately $220, and the group comprises 1.6% of the total customer population. Bubble 178 represents revenue slope class −1 (0°> revenue slope >−1°). This group has ARPU of nearly $300 and comprises 0.8% of the customer population. Finally, bubble 180 represents revenue slope class −2 (−1>° revenue slope >−20°). This group has ARPU of approximately $430 and comprise 1.6% of the customer population.

An important aspect of the invention is that the revenue slope is calculated for every customer in the customer base. Bubble chart plots such as chart 190 in FIG. 9 may be created for any number of different segments of the customer base.

The system that supports the method under discussion includes reporting tools that can quickly generate analysis results based on any number of different customer attributes. For example the system will include CRM related data for each customer, including geographic and demographic data, product and service portfolio data, usage behavior such as traffic volume, traffic type, traffic drivers, and so forth. Thus, for virtually any segment or category of customer, a business user can determine the percentages of similarly placed customers relative to the rest of the customer base. The business user may determine each group's ARPU and whether their revenue is trending upward or trending downward. Such information may have a significant impact on which customers should be selected to be hit by a marketing campaign. For example if a large group of like customers have high ARPU, but the ARPU is trending downward at a rapid rate, the enterprise may want to hit these customers with a marketing campaign to avoid further revenue erosion among a profitable segment of the customer population. Similarly low revenue customers where revenue is trending up slowly may be considered good targets to encourage more rapid revenue growth. Low revenue customers whose revenue is trending downward may not be worth the effort stimulate ARPU growth, and high revenue customers whose ARPU is increasing are generally not in need of ARPU stimulation.

The investigation on predefined variables identifies customer characteristics that are most relevant to increasing ARPU. This data along with historical revenue data are used to build an ARPU increase model 26. Multiple preconfigured statistical models may be employed to identify the best targets for the selected ARPU boost strategy. The type of statistical model employed may be dictated by the selected campaign or other factors inherent in the customer base. Examples of the statistical models that may be employed include a market basket analysis; billed usage increase propensity, product purchase propensity; and customer loyalty analysis. A market basket analysis for purchase propensity is a statistical analysis of the characteristics of customers who own a specific product in order to find customers with a similar propensity. A billed usage increase propensity analysis analyzes the characteristics of customers subject to a certain increase in billed usage over a period of time in order to identify other customers with similar anagraphical, behavioral, and value based characteristics. Product purchase propensity is a set of models differentiated by product type and purchase type. These models identify the characteristics of the customers that purchased a specific product in order to identify targets within the customer base for selling the product. Customer loyalty analysis includes a set of predictive tools for calculating a customer's propensity to leave or cancel a service provider's services.

Different ARPU boost strategies may require different statistical analysis tools for analyzing customer characteristics and revenue data. Building the ARPU increase model includes selecting the appropriate statistical approach and training the statistical model on historical data. According to an embodiment of the invention the statistical analysis tool selected is trained on actual data gathered prior to previous marketing campaigns of the same type under consideration. The statistical tool operates on the historical data and makes predictions for the revenue increase propensity for each customer. The benefit of using actual historical data from past campaigns is that the actual results are known, and can be used to validate and refine the model. This process of training and validating the model with historical data and actual results may be an iterative processes performed many times in succession as new results sets become available.

In addition to the statistical aspect of the ARPU increase model, a more deterministic component may be added as well. Certain campaigns may have proven most successful among specific segments of the customer population. For example one type of campaign may prove very successful among university students under the age of 25 living within a specified radius of a city center. Another campaign may be more successful among suburban parents. Yet another among working professionals. These types of deterministic characteristics may also be taken into account when building the ARPU increase model, and may be used to filter either the input to or the output from the statistical analysis tools.

Building the response model is similar to building the ARPU increase model except that rather than trying to determine the expected revenue increase for each customer, the response model must determine each customer's propensity to respond favorably to a campaign. Again, a set of preconfigured statistical models may be provided. Models may be built for specific campaigns if data are available, but also for families of campaigns. Like the ARPU increase model, the response model may be trained using historical data. The predicted results based on the historical data may be compared to actual results to refine the response model. Again, this may be an iterative process to continually improve the predictive power of the model.

Building the ARPU increase model 26 and building the response model 28, training them on historical data and validating the models with actual results marks the end of the Opportunity Identification phase 12 of the ARPU boosting method. At this point, the enterprise has determined what areas of the business would benefit from ARPU boosting and has designed a strategy for increasing ARPU. Further, the enterprise has examined the characteristics of its customer base relating to ARPU trends and other variables. The enterprise has created and trained statistical models for predicting the expected revenue increase for individual customers, and for determining their propensity to respond positively to a campaign. It is now time to enter the final phase of the ARPU boosting process, profit optimization 14.

The profit optimization phase 14 involves scoring customers 30, finalizing campaigns 32, and executing campaigns 34. The ARPU increase model and the response model are applied to current customer data in order to determine their propensity for ARPU increase and positive response to campaigns. Customers are scored according to their propensities. For example customers having a 0% ARPU increase propensity have the least likelihood of showing an ARPU increase, whereas customers having a 100% ARPU increase propensity are most likely to show an ARPU increase. Similarly, customers with a 0% propensity to respond favorably to a campaign are most likely to reject an offer, while those with a 100% propensity to respond favorably are most likely to accept. Most customer scores will fall between these two extremes. An important aspect of the present invention is that the two scores can be played off one another to identify an optimum mix of the customers most likely to respond positively to a campaign and those who show the greatest propensity for ARPU increase. A campaign in which all customers accept an offer, but exhibit little or no revenue increase will not be a successful campaign. Similarly, a campaign that reaches all of the customers having the highest propensity toward increasing ARPU but which is not accepted by any customers will likewise exhibit no positive ARPU increase results. The ideal mix is one in which a substantial number of customers will accept the campaign offer, and who exhibit a healthy propensity toward increasing ARPU.

FIGS. 10 and 11 show how the expected revenue increase model scoring and the positive response propensity model scoring can work together to identify the optimum campaign customer list for improving ARPU. FIG. 10 shows a circle chart 200 showing customer distribution by responsiveness to a marketing campaign. A first wedge 202 shows the proportion of customers having a positive response propensity of 10%-20%. A second wedge 204 shows the portion of the customer base having a positive response propensity of 20%-30%. Additional wedges 206, 208 and 210 show the portions of the customer population having positive response propensities of 30%-40%, 40%-50%, and 60%-70%, respectively. As can be seen, the group 204 having a positive response propensity of 20%-30% is the largest portion of the total customer base, comprising 36% of all customers. This group is followed by the wedge 208 representing customers having a positive response propensity of 40%-50%. These constitute 25% of the overall customer population. These groups are followed by groups 202 and 206 representing customers having positive response propensities of 10%-20% and 30%-40%. Each of these groups constitutes 17% of the total customer population. Finally, customers having a positive response propensity of 60%-70% are represented by the narrow wedge 210 forming but 6% of the total customer population.

FIG. 11 shows the results of filtering the group of customers represented by wedge 208 in chart 200 of FIG. 10 by their revenue increase propensities. This group, 25% of the total customer population, represents customers having a positive response propensity of 40%-50%. Of these, 31% fall into wedge 214 of the chart 212 in FIG. 11. This group represents customers having only a 10%-20% propensity to increase ARPU, 55% fall into wedge 216 which represents customers having a 30%-40% propensity to increase ARPU. 11% fall into the wedge 218 which represents customers having a 60%-70% propensity to increase ARPU.

By drilling down into the customer scores and filtering the data as described, business users can determine the best mix of customers having a high propensity to respond positively to a campaign and who will likely exhibit strong revenue growth. The power of such an analysis is evident when one considers the fact that an enterprise will typically have limited resources available to implement campaigns and may only be able to contact a limited number of customers during the course of a campaign. In order to conduct the campaign as efficiently as possible the enterprise will want to contact only those customers who are likely to accept the offer and who have a strong propensity toward increased revenue. As indicated above, selecting only those customers with a high propensity to accept an offer may not generate the greatest increase in revenue. Typically there will be a trade off between contacting customers who may be less likely to accept the offer, but who are much more likely to generate increased revenue. Analyzing the positive response propensity scores and the revenue increase scores together in this way assists the user in striking the most appropriate balance.

Alternative strategies for identifying the best group of customer to contact based on their ARPU increase and positive response propensity scores may be employed. One alternative may be to train the ARPU increase model on customers who responded positively in the past. In this embodiment a customer's ARPU increase score will reflect not just a general propensity for increasing revenue, but rather a revenue increase propensity resulting from a positive response to a particular campaign. Individual customers will likely exhibit different revenue increase propensities depending on the campaign offer presented to them. Accordingly, individual customer scores will be different from campaign to campaign. Employing this strategy customer lists may be compiled separately for each campaign. Customers may be selected based on their propensity to respond and their revenue increase propensity associated with a particular campaign offer. Again, customers having a high propensity to respond and a high propensity to increase revenue as a result of responding positively are the best targets to contact in the campaign. Other strategies may also be employed for analyzing the interaction between customer's positive response and revenue increase propensities.

Once the ARPU increase propensity and positive response propensity values have been determined and the criteria for selecting the most desirable targets have been established it is a relatively straight forward process to identify the customers satisfying the established criteria and building a campaign list from the identified customers. In fact, this process may be fully automated in the system architecture described below for supporting the present process. Once the initial list has been compiled the campaign may be finalized by adding additional requirements for defining targeted customers, such as excluding customers that have been contacted in other campaigns, and by making other refinements. Once the campaign has been finalized at 32, it only remains to be executed at 34. This simply requires communicating the ARPU boosting offer to the selected customers via the selected channel. Execution of the campaign may be performed by a dedicated campaign management system, marketing personnel, or by some other mechanism.

The method for boosting ARPU just described includes a number of automated and manual tasks. It combines human marketing prowess with highly automated and efficient data accumulation, storage, analysis, and presentation tools. The method allows business users to efficiently determine the best areas of the business in which to look for ARPU boosting opportunities, the best strategies for boosting ARPU and the best campaigns to use for boosting ARPU. The analytical tools employed in the ARPU boosting method further assist the marketing team in identifying the customers most likely to respond positively to a marketing campaign and who will likely generate the greatest increase in revenue by accepting an offer. By concentrating on the right customers, the campaign has a much better chance of achieving its goal, namely increasing the average revenue per user.

An important aspect of the present invention is the system that supports the analysis necessary to implement the above described method. The system captures an enterprise's operational data and stores it in a manner that is accessible by myriad analysis and reporting tools that allow the business user to analyze revenue streams, the effectiveness of previous campaigns, and various characteristics of the customer base in order to create the most effective and profitable marketing campaigns possible.

Figure 12:
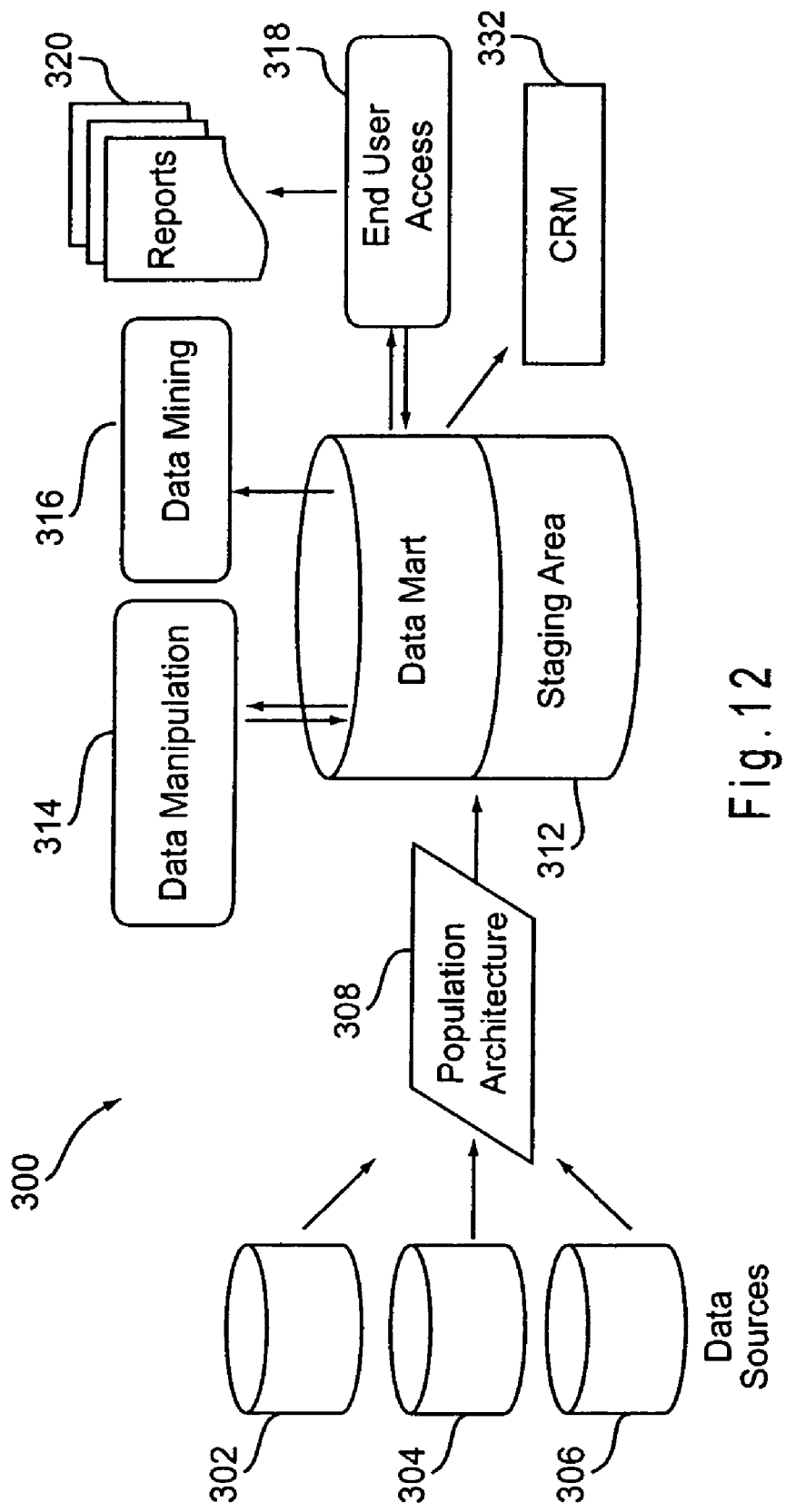
FIG. 12 is a block diagram of a system architecture for facilitating the design, creation, and implementation of direct marketing campaigns for increasing average revenue per user.

An embodiment of a system 300 is shown in FIG. 12. The system 300 includes a plurality of data sources 302, 304, 306. A dedicated data mart 310 forms the core of the system architecture 300. A population architecture 308 is provided to perform extraction, transformation and loading functions for populating the data mart 310 with the data from the various data sources 302, 304, 306. A data manipulation module 314 prepares data stored in the data mart 310 to be input to other applications such as a data mining module 316 and end user access module 318, or other applications. The data mining module 316 performs various statistical analyses on the data supplied to it in order to identify common characteristics of customers that may be relevant to boosting ARPU. The end user access module 318 provides an interface through which business users may view and analyze the data collected and stored in the data mart 310. The end user access module 318 may be configured to generate a plurality of predefined reports 320 for analyzing the data, and may also include online analytical processing (OLAP) so that a user may manipulate and contrast data "on the fly" to gain further insight into revenue data, historical trends, and the characteristics of customers who have responded positively to ARPU stimulation efforts in the past. Finally, other systems such as CRM 322 may also consume the efficiently stored data in the data mart 310.

In order to support the ARPU boosting method described above, the data mart 310 must be populated with revenue and customer data for each customer in the customer base. Revenue data may be provided by the enterprise billing system. Customer demographics, geographic data, and other data may be provided from a customer relationship management system (CRM). If the enterprise is a telecommunications services provider, usage patterns, traffic and interconnection data may be provided directly from network control systems. Alternatively, all or some of the data necessary to populate the data mart 310 may be provided by a data warehouse system or other mass storage system.

According to an embodiment, the data requirements of the system 300 are pre-configured and organized into logical flows, so that the data source systems 302, 304, 306, etc. supply the necessary data at the proper times to the proper location. Typically this involves writing a large text file (formatted as necessary) containing all of the requisite data to a designated directory. Because of the monthly billing cycle of most enterprises the data typically will be extracted on a monthly basis to update the data mart 310.

The population architecture 308 is an application program associated with the data mart 310. The population architecture is responsible for reading the text files deposited in the designated directories by the various data sources at the appropriate times. The population architecture may perform quality checks on the data to ensure that the necessary data are present and in the proper format. The population architecture 308 includes data loading scripts that transform the data and load the data into the appropriate tables of the data mart's 310 data model.

The data mart 310 is a traditional relational database and may be based on, for example, Oracle 9i or Microsoft SQL Server platforms. The data mart 310 is the core of the system 300. The customer and revenue data are optimized for fast access and analytical reporting according to a customized data model. Star schemas allow an efficient analysis of key performance indicators by various dimensions. Flat tables containing de-normalized data are created for feeding predictive modeling systems.

The data manipulation module 314 is provided to prepare data to be input into the data mining tool 316. The data manipulation module 314 generates large flat files dubbed "customer analytical records" (CARS). The CARS include multiple rows and columns. Each row relates to a customer. Each column represents a customer attribute or characteristic. The customer attributes contained in different CARS will vary depending on the variable being investigated. For example pre-defined CARS may be created based on industry specific knowledge in order to optimize the discovery power of the data mining tool 316. In this case, the CARS may contain specific customer attribute information regarding products and services that are relevant for mining data with respect to particular revenue streams, product or service offerings, marketing campaigns, and so forth.

The data mining tool 316 itself may be a commercially available product such as SAS Enterprise Miner, or the KXEN data mining tool. The data mining tool runs a plurality of different statistical models to evaluate customers and generate a score for each customer based on a specific variable. The score essentially ranks the customers by percentage according to the likelihood or the extent to which the variable under investigation applies to them individually. For example, if expected ARPU increase is the variable under investigation the data mining tool will return a value for each customer in the range from 0% to 100%. A customer receiving a 100% score being the most likely customer to see an increase in revenue, and a customer receiving a 0% score being the least likely to see an increase. The data mining tool 316 returns a flat file containing each customer, the customer's ID, the customer's score, and various statistical variables related to the customer's score. The data manipulation module 314 loads the output of the data mining tool back into the data tables of the data mart 310. In this way the data mining tool 316 may generate expected ARPU increase scores, and propensity to accept campaign scores for purposes of compiling target lists according to the ARPU boosting method described above.

The end-user access module 318 pulls data from the data mart 310 to be displayed for a user of the system. The end user access module 318 includes a plurality of preconfigured reports 320 as well as reports that may be configured by the user. The multiplicity of reports allow the user to dissect the customer and revenue data from as many different perspectives as may be desired. The preconfigured reports 320 include the diagnostic tree and trend analysis reports, the bubble charts associated with the investigation based on pre-defined variables, and the ARPU increase and propensity to accept campaign scoring results among many others. Because all of the data are accumulated and stored on a customer by customer basis, the online analytical processing capabilities of the end user access module 318 allow the end user to alter display criteria and filter customers by various customer attributes to significantly expand the business intelligence insights that may be gleaned from the various reports.

Finally, data stored in the data mart 310 may also be provided to external systems such as CRM 322. Information such as a customer's expected revenue increase may be used by such other systems in order to classify customers and to determine or affect the various protocols for interacting with different classes of customers.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method consisting of:
   extracting, by a processor executing an application program, revenue and customer data from external enterprise operating systems, and loading the data into a data mart;
   accessing, by the processor executing the application program, the data in the data mart to build an interactive diagnostic tree displayed to and manipulated by a user via a user access module, the diagnostic tree providing an analysis of the enterprise's revenue based on individual revenue streams, each revenue stream corresponding to the sale or use of various products or services offered by the enterprise, the interactive diagnostic tree displaying average revenue per user (ARPU) of the products or services corresponding to each revenue stream;
   generating, by the processor executing a user access module, interactive reports illustrating ARPU trends for analyzing ARPU changes over time, the diagnostic tree analysis and the ARPU trend analysis assisting a user to target a revenue stream for ARPU boosting and assessing marketing campaign results based on ARPU trends accompanying such campaigns;
   identifying, by the processor executing a user access module that receives commands from a user through a user interface, an appropriate ARPU increase lever that may be exploited by a direct marketing campaign to increase ARPU in the targeted revenue stream;
   mining, by the processor executing a data mining module, revenue and customer data stored in the data mart to develop statistical models of customer characteristics, the statistical models consisting of: a first model leading to a propensity for generating increased revenue; and a second model leading to a propensity for accepting a marketing campaign offer;
   scoring, by the processor executing the data mining module, individual customers, the scoring consisting of: a first score according to the individual customer's propensity to generate increased revenue; and a second score according to the individual customer's propensity to accept a marketing campaign offer;
   filtering, by the processor executing the data mining module, the customer base based on the first score and the second score for each of the individual customers;
   compiling, by the processor executing the data mining module, a target list of customers from the filtered results, the target list identifying customers likely to respond favorably to a campaign and most likely to generate additional revenue as a result of responding favorably to a campaign; and
   executing, by the processor executing through a campaign channel, the direct marketing campaign.

2. The method of claim 1 wherein the diagnostic tree includes an ARPU reference value for each revenue stream, and an ARPU GAP value representing the difference between the actual ARPU value and the reference ARPU value for each revenue stream.

3. The method of claim 2 wherein each revenue stream is divided into a plurality of selectable resolution levels, each level dividing the revenue stream into a narrower definition of the revenue source, the interactive diagnostic tree displaying the ARPU, reference ARPU and ARPU gap values for each revenue stream corresponding to the selected resolution level.

4. The method of claim 1 wherein generating interactive reports illustrating ARPU trends includes displaying at least one of ARPU, ARPU reference and ARPU gap values for a revenue stream from multiple different time periods.

5. The method of claim 1 wherein revenue data are received from an enterprise billing system in synchronization with the enterprise's billing cycle.

6. The method of claim 1 wherein customer data are received from a customer relationship management system.

7. The method of claim 1 wherein customer data are received from a data warehouse system.

8. The method of claim 1 wherein the enterprise is a telecommunications service provider and the various revenue streams correspond to various telecommunications services provided by the telecommunications service provider.

9. The method of claim 8 wherein an appropriate ARPU increase lever is selectable from the group comprising:
increasing usage of an existing service;
increasing revenue demand for an existing service; and
enhancing the subscriber base of an existing service.

10. A business intelligence system architecture consisting of:
a processor;
a data mart, controlled by the processor, that stores customer and revenue data;
a population architecture that when executed by the processor extracts data from external business operating systems, transforms the data, and loads the data into the data mart, the external business operating systems being configured to supply revenue and customer data in synchronization with the business's billing cycle;
a data manipulation module that when executed by the processor prepares and transports data between the data mart and the data mining module;
a data mining module that when executed by the processor generates statistical models that characterize the revenue and customer data, the statistical models consisting of: a first model that calculates a customer's propensity to accept a campaign offer, and a second model that calculates a customer's propensity to generate increased revenue;
a user access module, including an interface, that when executed by the processor receives commands from a user and displays analysis results, the user access module including a plurality of preconfigured and configurable reports that present customer and revenue data to a user, and online-analytic processing to pull data from the data mart to populate reports requested by a user; and
an interactive diagnostic tree displayed to and manipulated by the user via the user access module, wherein the diagnostic tree providing an analysis of the revenue data based on individual revenue streams.

11. The business intelligence system architecture of claim 10 wherein the data manipulation model, when executed by the processor, pulls data from the data mart and creates flat files comprising customer records and associated customer attributes that the data mining module analyzes.

12. The business intelligence system architecture of claim 10 wherein the plurality of preconfigured reports includes the diagnostic tree analysis of the business's revenue stream, the diagnostic tree analysis including average revenue per user (ARPU) values for a plurality of different revenue streams, ARPU target values associated with the different revenue streams, and an ARPU gap value corresponding to a difference between an ARPU value of a revenue stream and a corresponding ARPU target value.

13. The business intelligence system architecture of claim 10 wherein the plurality of preconfigured records include an ARPU trend analysis for illustrating changes in ARPU for one or more revenue streams overtime.

14. The business intelligence system architecture of claim 10 wherein the plurality of preconfigured reports include an analysis of the ARPU trend of various customer segments overtime, wherein the customer segments are defined by one or more common characteristics of customers.

15. The business intelligence system architecture of claim 10 wherein the preconfigured reports include interactive displays, controlled by the processor, that display customer distributions based on customer characteristics.

16. The business intelligence system architecture of claim 15 wherein said customer distributions are calculated by the data mining module executed by the processor by the data mining module filtering a first customer characteristic according to a second customer characteristic.

17. The business intelligence system architecture of claim 16 wherein said customer characteristics include a propensity to accept a marketing campaign offer and a propensity to generate increased revenue.

18. A method consisting of:
analyzing, by a processor executing an application program, the business's sources of revenue to identify an under performing revenue stream, comprising constructing an interactive diagnostic tree displayed to and manipulated by a user via a user access module, wherein the interactive diagnostic tree illustrates a plurality of the business's revenue streams and displays a average revenue per user (ARPU) value for each revenue stream;
selecting, by the processor executing the user access module that receives a user's selection, a direct marketing campaign consistent with stimulating increased revenue from the identified under performing revenue stream;
building, by the processor executing a data mining module, two predictive models consisting of a first predictive model that determines a customer's propensity to generate additional revenue,
and a second predictive model that determines a customer's propensity to respond positively to a direct marketing campaign;
scoring, by the processor executing the data mining module, individual customers in the business's customer base, the scoring consisting of: a first score and a second score according to the first and second predictive models, respectively, to determine each customer's propensities to generate increased revenue and to respond positively to a direct marketing campaign;
selecting, by the processor executing the user access module that receives selections from the user, customers to be targeted by the direct marketing campaign according to both the customer's propensity to generate increased revenue and the customer's propensity to respond positively to the campaign, such that a potential for revenue increase from the campaign is optimized by targeting customers who are predisposed to both respond positively to the campaign and generate increased revenue as a result of the customer's positive response; and
executing, by the processor executing through a campaign channel, the direct marketing campaign that contacts the selected customers.

19. The method of claim 18 wherein analyzing the business's sources of revenue to identity an under performing revenue stream comprises an ARPU reference value for each revenue stream, and an ARPU gap for each revenue stream based on the difference between the ARPU value and ARPU reference value for each revenue stream.

20. The method of claim 19 wherein the interactive diagnostic tree includes a hierarchy of resolution levels, wherein at each resolution level the revenue streams are divided into smaller more focused revenue tributaries, and ARPU values, ARPU reference values and ARPU gap values are selectively displayed for each resolution level.

21. The method of claim 18 further comprising assessing previous targeted direct marketing campaigns to determine which offers have been successful in increasing revenue in the past, and amongst which customers the previous campaigns have been successful.

22. The method of claim 18 further comprising analyzing, by the data mining module when executed by the processor, customer attributes to identify characteristics of customers who generated increased revenue in the past, and additional customer's having similar characteristics that show a greater propensity to increase revenue in the future.

23. The method of claim 22 wherein analyzing customer attributes includes analyzing demographic data.

24. The method of claim 22 wherein analyzing customer attributes includes analyzing geographical data.

25. The method of claim 22 wherein analyzing customer attributes includes analyzing service subscription portfolios.

26. A method consisting of:
analyzing, by a processor executing an application program, a plurality of revenue streams to identify a revenue stream whose performance is below a desired level, comprising accessing, by the processor executing the application program, data in a data mart to build an interactive diagnostic tree displayed to and manipulated by a user via a user access module;
selecting, by the processor executing the user access module that receives a user's selection through a user interface that displays the interactive diagnostic tree, a direct marketing campaign that includes a product or service offer which will lead to an increase in revenue in the identified under performing revenue stream when the offer is accepted by a customer;
calculating by the processor executing a data mining module, two scores consisting of a first score indicative of a propensity to accept a campaign offer by individual customers, and
a second score indicative of a propensity for generating increased revenue by individual customers; and
selecting, by the processor executing the user access module that receives the user's selection through a user interface, a target group of customers to whom the product or service offer will be offered based on each customer's propensity to accept a campaign offer, and each customer's propensity to generate increased revenue.

27. A system architecture consisting of:
a processor;
a relational database, controlled by the processor, having a data model;
a data source, accessible by a population architecture when executed by the processor, that provides customer and revenue data;
the population architecture, further when executed by the processor, extracts data from the data source, transforms the extracted data, and loads the transformed data into the relational database according to the data model;
a data manipulation module that when executed by the processor pulls data from the relational database and prepares the data to perform data mining;
a data mining module that when executed by the processor analyzes the customer and revenue data prepared by the data manipulation module to identify characteristics of customers leading to a propensity to accept a marketing campaign offer, and a propensity to generate increased revenue, and scores individual customers, the scoring consisting of: a first score according to each customer's individual customers individual propensity to accept a marketing campaign offer, and a second score according each customer's individual propensity to generate increased revenue, and stores the scoring results in the relational database;
a user access module that when executed by the processor accesses the data stored in the database, wherein the user access module includes: an interface that when executed by the processor displays data and receives commands from the user;
a plurality of pre-configured reports that when executed by the processor presents data including a distribution of customers based on the customers propensity to accept a marketing campaign offer and propensity to generate increased revenue; and
an interactive diagnostic tree displayed to and manipulated by the user via the user access module, wherein the diagnostic tree provides analysis including average revenue per user (ARPU) values for different revenue streams, ARPU target values associated with the different revenue streams, and an ARPU gap value corresponding to a difference between an ARPU value of a revenue stream and a corresponding ARPU target value.

* * * * *

UNITED STATES PATENT AND TRADEMARK OFFICE
CERTIFICATE OF CORRECTION

PATENT NO. : 7,917,383 B2  
APPLICATION NO. : 11/291439  
DATED : March 29, 2011  
INVENTOR(S) : Matteo Maga et al.

It is certified that error appears in the above-identified patent and that said Letters Patent is hereby corrected as shown below:

On the Title Page

Page 2, right column, lines 18-19, delete "United States Patent and Trademark Office Action dated Jul. 23, 2009 for co-pending U.S. Appl. No. 11/291,438."

Signed and Sealed this  
Thirteenth Day of September, 2011

David J. Kappos  
*Director of the United States Patent and Trademark Office*